US008842602B2

(12) United States Patent
Koo et al.

(10) Patent No.: US 8,842,602 B2
(45) Date of Patent: Sep. 23, 2014

(54) ENHANCEMENT OF IN-DEVICE COEXISTENCE INTERFERENCE AVOIDANCE

(75) Inventors: Changhoi C. Koo, Plano, TX (US); Jun Li, Richardson, TX (US); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 202 days.

(21) Appl. No.: 13/194,412

(22) Filed: Jul. 29, 2011

(65) Prior Publication Data

US 2013/0028201 A1    Jan. 31, 2013

(51) Int. Cl.
*H04W 4/00*    (2009.01)
*H04W 72/12*   (2009.01)

(52) U.S. Cl.
CPC ...... *H04W 72/1215* (2013.01); *H04W 72/1284* (2013.01)
USPC ............................ 370/326; 370/252; 370/310

(58) Field of Classification Search
USPC ......... 370/252, 329, 336, 254, 310, 315, 280; 455/452.1, 509, 501, 436, 68
See application file for complete search history.

(56) References Cited

U.S. PATENT DOCUMENTS

| 7,725,118 | B2 | 5/2010 | Yang et al. |
| 8,005,108 | B1 | 8/2011 | Broad et al. |
| 8,095,176 | B2 | 1/2012 | Sudak |
| 8,185,058 | B2 | 5/2012 | Capretta et al. |
| 8,412,263 | B2 | 4/2013 | Sudak |
| 8,693,950 | B2 | 4/2014 | Desai |
| 2003/0098792 | A1 | 5/2003 | Edwards et al. |
| 2008/0051085 | A1 | 2/2008 | Ganton |
| 2009/0279511 | A1* | 11/2009 | Zhu ............................... 370/336 |
| 2010/0197235 | A1 | 8/2010 | Wilhelmsson |
| 2011/0157957 | A1 | 6/2011 | Kim |
| 2012/0033762 | A1 | 2/2012 | Tseng et al. |
| 2012/0034913 | A1 | 2/2012 | Wang et al. |
| 2012/0071185 | A1* | 3/2012 | Dayal et al. .................... 455/509 |
| 2012/0094681 | A1* | 4/2012 | Freda et al. ................. 455/452.1 |
| 2012/0155303 | A1* | 6/2012 | Kuo .............................. 370/252 |
| 2012/0164948 | A1 | 6/2012 | Narasimha et al. |
| 2012/0195291 | A1* | 8/2012 | Kuo .............................. 370/336 |
| 2012/0207040 | A1* | 8/2012 | Comsa et al. ................. 370/252 |
| 2012/0213162 | A1* | 8/2012 | Koo et al. ..................... 370/329 |
| 2012/0214489 | A1* | 8/2012 | Koo et al. ..................... 455/436 |

FOREIGN PATENT DOCUMENTS

WO    2009/137295    11/2009

OTHER PUBLICATIONS

3GPP TSG RAN #48, RP-100671, New Study Item Proposal: Signalling and procedure for in-device coexistence interference avoidance, Seoul, Korea, Jun. 2010.
3GPP TSG RAN WG4 Meeting #55, R4-102268: LS on in-device coexistence interference, Montreal, Canada, May 2010.

(Continued)

*Primary Examiner* — Abdullah Riyami
(74) *Attorney, Agent, or Firm* — Fish & Richardson P.C.

(57) ABSTRACT

A method, system and device are provided for avoiding in-device coexistence interference between different radio technologies deployed in adjacent bands on the same device by reporting uplink buffer status information to the radio network and configuring LTE and non-LTE components to provide an in-device coexistence operation mode where non-LTE components use radio resources during the non-LTE on-intervals and during off-intervals inserted into the LTE on-intervals in response to predetermined trigger events.

18 Claims, 7 Drawing Sheets

(56) References Cited

OTHER PUBLICATIONS

3GPP TSG RAN WG4 Meeting #54, R4-100706: Coexistence studies between LTE and WLAN, San Francisco CA, Feb. 2010.
3GPP TSG RAN WG4 Meeting #54, R4-100707: Addition of LTE UE RF requirements for coexistence with WLAN, San Francisco CA, Feb. 2010.
3GPP TR36.816 v1 Technical Specification Group Radio Access Networks; Evolved universal Terrestrial Radio Access (E-UTRA); Study on signalling and procedure for interference avoidance for in-device coexistence (Release 10), Aug. 2010.
3GPP TS36.321: Technical Specification Group Radio Access Networks; Evolved Universal Terrestrial Radio Access (E-UTRA); Medium Access Control (MAC) protocol specification (Release 10), Dec. 2010.
3GPP TR 36.816 V1.0.0 (Nov. 2011); "3rd Generation Partnership Project; Technical Specification Group Radio Access Networks; Evolved Universal Terrestrial Radio Access (E-UTRA); Study on Signalling and Procedures for Interference Avoidance for In-Device Coexistence (Release 10)"; Dec. 17, 2010; 34 pages.
Intel Corporation (UK Limited); "Discussion on In-Device Coexistence Scenarios and Solutions"; 3GPP TSG-RAN WG2 #71 (R2-104382); Madrid, Spain; Aug. 23-27, 2010; 3 pages.
MediaTek; "Investigation on RRM Solutions for In-Device Coexistence"; 3GPP TSG-RAN WG2 Meeting #71bis (R2-105448); Xi'an, China; Oct. 11-15, 2010; 3 pages.
Research In Motion UK Limited; "Buffer Status Reporting for TDM Solution"; 3GPP Draft RAN WG2 (R2-113881); Athens Greece; Aug. 15, 2011; 4 pages.
International Search Report and Written Opinion of the International Searching Authority issued in International Application No. PCT/US2011/045874 on Mar. 21, 2012; 13 pages.
Invitation to Pay Additional Fees and Partial International Search Report issued in International Application No. PCT/US2011/045910 on Mar. 29, 2012; 8 pages.
International Search Report and Written Opinion of the International Searching Authority issued in International Application No. PCT/US2011/045910 on May 22, 2012; 17 pages.
International Preliminary Report on Patentability under Chapter I issued in International Application No. PCT/US2011/045874 on Feb. 13, 2014; 8 pages.
International Preliminary Report on Patentability under Chapter I issued in International Application No. PCT/US2011/045910 on Feb. 13, 2014; 11 pages.
Long Term Evolution, 3GPP LTE Radio and Cellular Technology, Edited by Borko Furht and Syed A. Ahson; Auerbach Publications 2009; Chapter 4.

* cited by examiner

ENHANCEMENT OF IN-DEVICE COEXISTENCE INTERFERENCE AVOIDANCE

BACKGROUND

1. Field

In general, communications systems and methods for operating same are disclosed. In one aspect, methods, systems and devices are disclosed for managing coexistence interference between different radio technologies deployed in adjacent bands.

2. Description of the Related Art

The growing market of smart connected devices requires that the same device supports multiple radio technologies on the in-device platform. However, some configurations may cause severe performance degradation due to mutual in-device coexistence (IDC) interference. For example, with devices that support both Long Term Evolution (LTE) and Industrial, Science and Medical (ISM) technologies (such as Bluetooth and/or WLAN) and/or Global Navigation Satellite System (GNSS) technologies, there are use cases for concurrent operation of these radios. Coexistence issues may arise between ISM and/or GNSS technologies and LTE deployed in adjacent bands. As shown in Table 1 below, coexistence interference may arise where ISM transmission creates interference to the LTE receiver, and may also arise where LTE transmission creates interference to the ISM receiver.

TABLE 1

Interference of the LTE and ISM components on the in-device configuration

| LTE TDD (2.3-2.4 GHz, Band 40) LTE UL (2.5-2.6 GHz, Band 7) | ISM (2.4-2.4835 GHz) | Coexistence |
|---|---|---|
| Rx | Tx | LTE: Interfered ISM: Normal |
| Tx | Rx | LTE: Normal ISM: Interfered |

Similar coexistence issues may occur with devices that include both LTE and GNSS components. As shown in Table 2 below, when LTE and GNSS components are working on the same device, there may be interference due to adjacent frequency band operation or harmonic frequencies which cannot be avoided by the allocation of a guard band at the sub-harmonic frequency.

TABLE 2

Interference of the LTE and GNSS component configuration on in-device

| LTE (777-787 MHz/746-756 MHz, Band 13) (788-798 MHz/758-768 MHz, Band 14) | GNSS (1575.42 MHz) | Coexistence |
|---|---|---|
| Tx | Rx | LTE: Normal GNSS: Interfered |

As will be appreciated, there are challenges to using current state-of-the-art filter technology to address coexistence interference since filters do not provide sufficient rejection on the adjacent channel interference. These challenges are particularly acute in the case of these components configured in a single device where the interference occurs when the LTE component is transmitting on the specified bands. Accordingly, a need exists for improved method, system and device for managing coexistence interference between different radio technologies. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

Reference is now made to the following drawings, in which.

DETAILED DESCRIPTION

Figure 1:
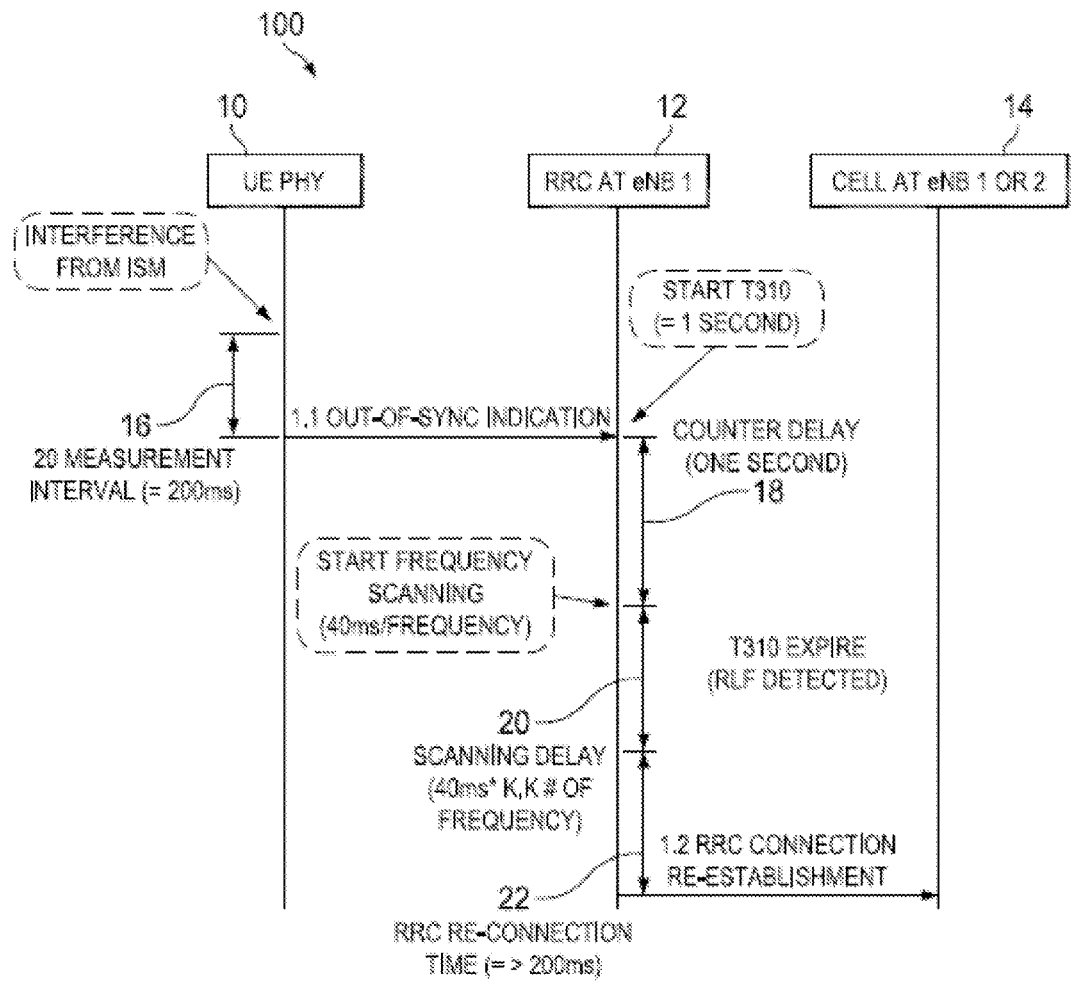
FIG. 1 is a signal flow diagram illustrating how existing radio resource management signaling procedures may be used to address coexistence interference.

A method, system and device are provided for avoiding in-device coexistence (IDC) interference between different radio technologies deployed on the same device. In selected embodiments, a buffer status reporting method and apparatus are provided for efficiently signaling uplink traffic volume from the UE device in the form of threshold or volume information (or both) to assist with efficient allocation of time patterns by the eNB device. In still further embodiments, a method and apparatus are provided for establishing coexistence mode by controlling and separating the LTE signaling and the non-LTE signaling with designated LTE on-intervals that can be modified by inserting off-intervals when warranted by traffic conditions, thereby establishing a time division multiplexing-based solution in which there is no coexistence interference.

Various illustrative embodiments will now be described in detail with reference to the accompanying figures. While various details are set forth in the following description, it will be appreciated that the embodiments may be practiced without these specific details, and that numerous implementation-specific decisions may be made to the embodiments described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram and flow chart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments will now be described in detail below with reference to the figures.

Ongoing 3GPP discussions have addressed the technical challenges associated with addressing interference caused by concurrent operation of multiple radio technologies. The difficulties here may be understood with reference to the example of a single device which supports LTE technology with ISM (e.g., Bluetooth and/or WLAN) and/or GNSS technologies which can interfere with one another, such as when the ISM transmitter interferes with the LTE receiver, or when the LTE transmitter causes interference with the ISM and GNSS receiver operations. For example and as reported at the 3GPP report R4-102268 entitled "LS on in-device coexistence interference," the Bluetooth (BT) component error rate is unacceptable when an LTE component is active in some channels of Band 7 or even Band 40 for some BT component channel conditions. Thus, even though there is no degradation to the LTE component, simultaneous operation with the BT component can result in unacceptable disruption in voice services terminating in a BT headset. A similar issue exists when LTE transmissions interfere with GNSS components. Currently, there is no RRM (Radio Resource Management) mechanism for addressing this issue since LTE by itself does not experience any degradation. There are also interference scenarios for the LTE components caused by the non-LTE components. For example and as reported in the 3GPP report R4-102268, the LTE downlink (DL) error rate can be very high (44-55% on PDSCH) when the BT component is active and LTE is deployed in Band 40.

There have been attempts to address the coexistence interference problems using existing radio resource management (RRM) mechanisms and signaling procedures, such as RSRQ (Reference Signal Received Quality) measurement, inter-frequency/inter-RAT handover, cell (re)selection, RLF (Radio Link Failure) monitoring and connection (re)establishment. The main issues and discussions are on 1) how to identify the in-device coexistence interference 2) how to notify the network of in-device coexistence interferences 3) what kind of signaling, operation and procedures are necessary to avoid in-device coexistence interference and 4) how to choose the best way, Frequency Division Multiplexing (FDM) or Time Division Multiplexing (TDM), to avoid in-device coexistence interferences, etc. However, existing procedures require further evaluation to determine if they could handle the coexistence interference and guarantee the required quality of service (QoS). For example, a normal LTE handover procedure using RRC (Radio Resource Control) message exchange is not guaranteed to succeed when there is LTE DL interference since high DL error rates can lead to a DL Radio Link Failure (RLF), which in turn can cause unacceptable problems when the UE attempts to re-establish the connection by accessing another frequency.

One such problem with using existing RRM mechanism is the QoS degradation caused by delay in recovering from RLF which is supposed to be used only in extreme scenarios and is not designed for maintaining QoS guarantee of an on-going connection. In particular and as illustrated with reference to the signal flow diagram 100 shown FIG. 1, the time to declare RLF can be quite large, depending on the network settings of the RLF timer T310. Once the UE 10 has declared DL RLF upon detecting interference from another device radio component (e.g., ISM), the UE performs an initial search during a first measurement interval 16 before sending the Out-of-Synch Indication (signal flow 1.1), shown in this example as requiring 200 ms. Then, the UE must access a different channel which leads to additional delay at the source eNB 12 associated with the counter delay 18 from the RLF timer T310 (e.g., 1000 ms), frequency scanning delay 20 (e.g., 40 ms×k, where k is the number of frequencies), and RRC reconnection time 22 (e.g., at least 200 ms) until such time as RRC connection is established via signal flow 1.2 to cell 14 at the same or different eNB. In this example, RLF recovery can take at least 1.56 sec (=200 ms+1000 ms+40 ms*k+200 ms, when k=4) to determine and recover from radio link failure.

A number of contributions, proposals and issues have been proposed to resolve the in-device coexistence problem, but final conclusions have not been reached. For example and as disclosed at 3GPP TR36.816 v1.0.0.1: entitled "Study on signalling and procedure for interference avoidance for in-device coexistence" (Release 10), three different operation modes ("Uncoordinated," "Coordinated within UE only" and "Coordinated within UE and Network") and basic solutions (FDM and TDM) are proposed. In the "Uncoordinated" mode, different components within the same UE operate independently without any internal coordination between different components (LTE, ISM and GNSS). In the "Coordinated within UE only mode," there is an internal coordination between the different components within the same UE, which means that at least the activities of one radio is known by other component's radio, however the eNB is not aware of the coexistence issue possibly experienced by the UE and is therefore not involved in the coordination. In the "Coordinated within UE and with Network mode," different components within the UE are aware of possible coexistence problems and the UE can inform the eNB about such information and problems, so it is then mainly up to the network to decide how to avoid coexistence interference. As proposed, FDM has two different possible solutions, 1) moving LTE signal away from ISM frequency band and 2) moving ISM signal away from LTE frequency band. Based on these potential solutions and modes, some proposals and decisions have been made as a baseline for the initial discussion and study, but only concept and problem in principle have been introduced and captured, and more detail solutions and proposals will be submitted and presented in the future meetings.

FDM Solutions

With FDM solutions, the UE informs the E-UTRAN when transmission/reception of LTE or other radio signal would benefit or no longer benefit from LTE not using certain carriers or frequency resources. With this approach, UE judgment is taken as a baseline approach for the FDM solution, i.e., the UE will indicate which frequencies are (not) useable due to in-device coexistence. The indication can be sent by the UE whenever it has a problem in ISM DL reception it cannot solve by itself. The indication can also be sent by the UE whenever it has a problem in LTE DL reception it cannot solve by itself, and the eNB did not take action yet based on RRM measurements. When LTE UL transmission interferes with ISM/GNSS DL reception, LTE measurements cannot be used to detect the problem and the details of the trigger(s) for the UE to report the problem will probably not be specified in 3GPP. When ISM UL transmission interferes with LTE DL reception, it needs to be determined whether more detailed LTE DL measurement or trigger needs to be specified (e.g., with respect to when to take the measurement in relation to ISM transmissions).

The indication from the UE that a problem occurs can be classified as either reactive (meaning that a problem is reported only when it is detected), or proactive (meaning that potential problems are reported). Reactive indications are supported as the baseline and it is still be determined whether proactive indications, which are not based on LTE DL measurements, should be allowed. Proactive refers to the case that the UE reports that a frequency (serving frequency or candidate frequency) may suffer from unacceptable high interference if the ISM transmitter increases its activity. Proactive indications could be sent in the following two cases: 1) the UE asks the network not to hand itself over to certain of non-serving frequencies that may experience coexistence issues (e.g., due to increase of ISM traffic), or 2) the UE asks the network to change current serving frequency because coexistence problems may become serious due to increased ISM traffic.

In response to the UE's indication message to the eNB that there is interference from non-LTE components, the eNB sends a response message with any solution, FDM or TDM, to restore communication with the eNB. However, the response message may not be received correctly if DL reception of LTE component is severely interfered by UL transmission of non-LTE components. To address this scenario, a non-interfering downlink signaling channel may be allocated for exchanging downlink response messages which can avoid interference.

TDM Solutions

With TDM solutions, it is assumed that SCO, eSCO, A2DP and ACL protocols are supported by in-device BT radio when analyzing the TDM solutions for LTE-BT coexistence. In addition, beacon, power saving and DCF protocols are assumed to be supported by in-device WiFi radio when analyzing the TDM solutions for LTE-WiFi coexistence. For TDM solutions without UE suggested patterns, the UE signals the necessary information (e.g., interferer type, mode and possibly the appropriate offset) in subframes to the eNB. Based on such information, the TDM patterns (i.e., scheduling and unscheduled periods) are configured by the eNB. For TDM solution with UE suggested patterns, the UE suggests the patterns to the eNB, and the eNB must then decide the final TDM patterns. In 3GPP TR36.816 v1.0.0.1, there are two proposed TDM solutions—a Discontinuous Reception (DRX) based solution and H-ARQ process reservation based solution.

In the DRX-based solution, the UE provides the eNB with a desired TDM pattern. For example, the parameters related to the TDM pattern can consist of (1) the periodicity of the TDM pattern, and (2) the scheduled period (or unscheduled period). It is up to the eNB to decide and signal the final DRX configuration to the UE based on UE suggested TDM pattern and other possible criteria (e.g., traffic type). The timing pattern consists of On-time interval for LTE component and Off-time interval for non-LTE component. Thus, during On-time interval the LTE component transmits and receives the signal with the eNB whereas non-LTE component transmits and receives the signals with its base station (e.g., Access Point for WiFi and Master node for BT) during Off-time interval. In case of data transmission, the instance of On/Off time interval are quickly varied and allocated due to the data transmission characteristics (e.g. Data Burstiness). However current operations cannot support this quick timing interval transition because the On-time and Off-time intervals are coarsely allocated by the eNB. In addition, during the On-time interval for the LTE component, it needs to allow for the non-LTE component to transmit and receive the data if the LTE component does not occupy the On-time interval instantaneously.

In H-ARQ process reservation-based solution, a number of LTE HARQ processes or subframes are reserved for LTE operation, and the remaining subframes are used to accommodate non-LTE components (e.g., ISM and/or GNSS traffic). For example, for LTE TDD UL/DL Configuration 1, subframe #1, #2, #6 and #7 are reserved for LTE usage, and other subframes may be used for non-LTE components. The UE may not be required to receive PDCCH/PDSCH and/or transmit PUSCH/PUCCH in those subframes, depending on coexistence scenarios. It is up to the eNB to decide and signal the final time pattern to the UE based on some assistance information reported by the UE. With respect to the assistance information, the UE can indicate either:

Time offset between BT and LTE+BT configuration, or
In-device coexistence interference pattern(s), or
ARQ process reservation based pattern(s)

Since the reserved subframes can be restricted by the eNB, the eNB can restrict DL allocation/UL grants inside this time pattern. However, the standards groups have not yet determined how frequently the eNB can restrict DL allocation/UL grants inside the time pattern, and more detail solutions and proposals will be submitted and presented in the future meetings. To address this scenario, selected embodiments propose buffer status reporting procedures for improving time pattern allocations used to manage in-device coexistence interference. In addition, there are disclosed herein techniques for using signaling and information elements for modifying the operation of the in-device coexistence platform to include one or more off-intervals during a designated LTE on-interval to provide more opportunities for non-LTE components.

In selected embodiments, there are disclosed signaling procedures for a coexistence operation mode wherein new or modified RRC signaling messages are exchanged between the network and the mobile device for efficiently reporting an indication of the uplink transmission volume that may be used by the eNB device to allocate more efficient TDM time patterns to enable coexistence operation between LTE and non-LTE components (e.g., ISM and GNSS). The uplink transmission volume indication may be determined at the UE device by providing an uplink buffer status report for one or more different priority buffers, either as a measure of the contents of the buffer, an indication on whether the buffer contents have exceeded a threshold level, or some hybrid arrangement. Thus, there is no limitation or restriction to any particular application or messaging scheme since the functionality of the proposed buffer status report messages could be adopted as information elements (IE) in other new or existing RRC messages (e.g., MeasurementReport, UEInformationResponse, RRCConnectionRequest, RRCConnectionReconfigurationComplete, or RRCConnectionReestablishmentRequest messages). Of course, the specific names used here are for illustration only, and other names may be used to achieve the described function or outcome from the processing of the message.

In other embodiments, there are disclosed signaling procedures for a coexistence operation mode wherein new or modified RRC signaling messages are exchanged between the network and the mobile device for establishing a time division multiplex (TDM) mode of operation in which off-intervals are inserted into an initially allocated on-interval to enable coexistence operation between LTE and non-LTE components (e.g., ISM and GNSS). By providing for the insertion of one or more off-intervals into an LTE on-interval, more flexible time resource allocation can be provided for non-LTE components. Thus, there is no limitation or restriction to any particular application or messaging scheme since the functionality of the proposed off-interval insertion messaging scheme could be adopted as information elements (IE) in other new or existing RRC messages (e.g., RRCConnectionReconfiguration, UEInformationRequest, RRCConnectionRequest, RRCConnectionReconfigurationComplete, RRCConnectionReestablishmentRequest or RRCConnectionReestablishmentComplete messages). Of course, the specific names used here are for illustration only, and other names may be used to achieve the described function or outcome from the processing of the message.

Figure 2:
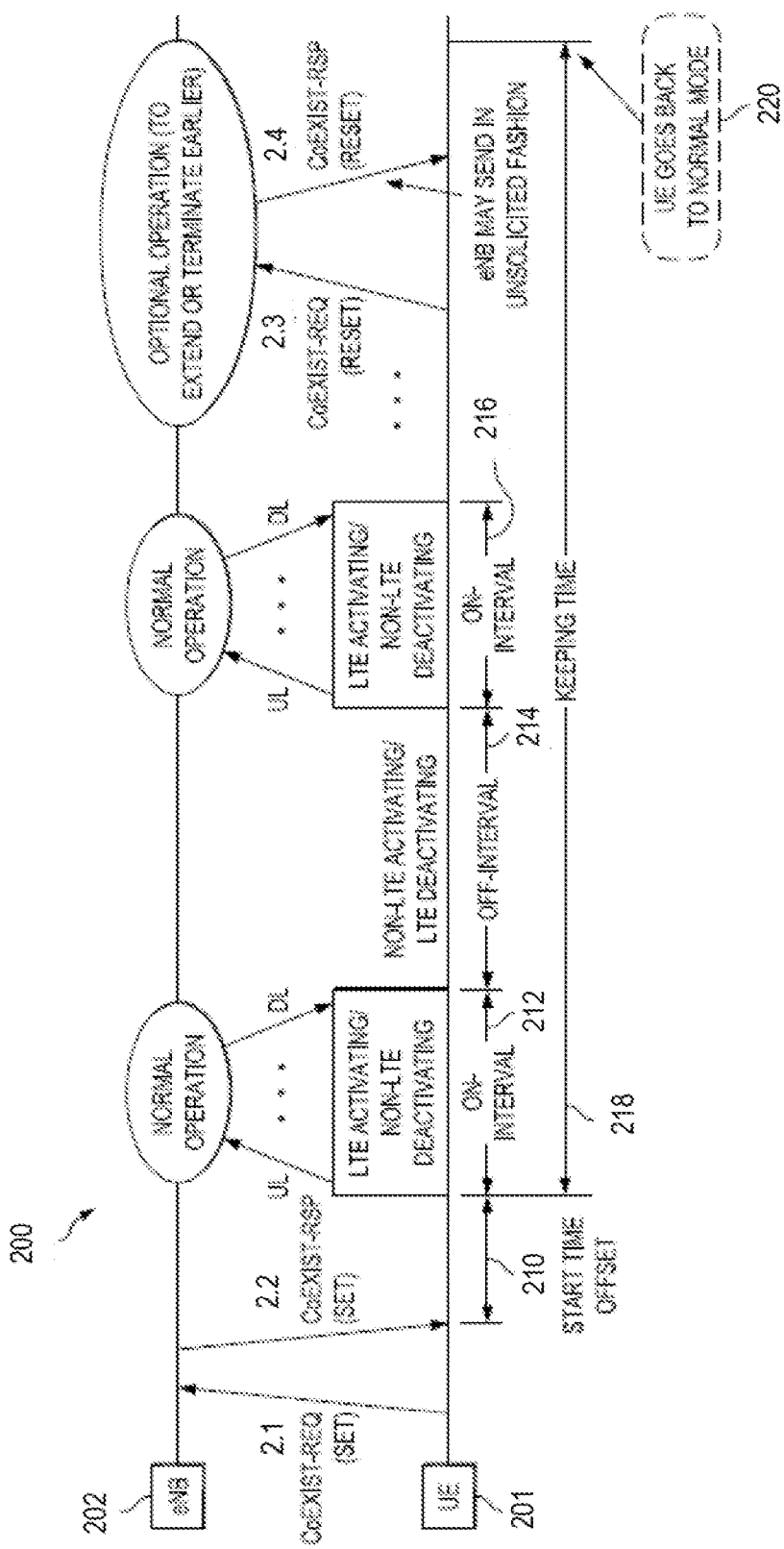
FIG. 2 is a signal flow diagram illustrating a radio resource control signaling call flow in accordance with selected embodiments.

To illustrate the role of the buffer status reporting and off-interval insertion, reference is now made to FIG. 2 which depicts a radio resource control signaling call flow 200 in accordance with selected embodiments wherein LTE and non-LTE components installed on a single UE device platform exchange coexistence signaling messages to separate the LTE and non-LTE signaling in time, thereby avoiding coexistence interference. On this shared platform, the LTE component on the UE 201 can know the instance when the non-LTE component is enabled, or can otherwise detect when an internal request to switch to non-LTE component is initiated. In response, the UE 201 can request coexistence mode operation by sending an indication message in an uplink transmission to the eNB 202 that in-device coexistence interference has been detected. The indication message from the UE 201 can be a simple message indicating that IDC interference has been detected, or can be a specific uplink request message (e.g., CoEXIST-REQ message 2.1) to the eNB 202 with proposed coexistence parameters. In selected embodiments, the uplink message 2.1 may also include a buffer status report to let the eNB 202 know the uplink transmission status of the LTE component on the UE 201 so that the eNB 202 an allocate efficient time patterns. In addition, the uplink message 2.1 may include one or more proposed coexistence parameters, such as a Start Time Offset, Keeping Time, LTE On-interval, non-LTE On-interval, LTE Off-interval, Possible Link, and an Action field set to "1." As described more fully below, the LTE off-interval is used to temporarily reduce the duration of the LTE on-interval in order to more efficiently allocate time patterns. If the LTE component at the UE 201 is coexisting with ISM components, the Possible Link parameter can be set to "Nothing" in order to ensure no coexistence interference issues. On the other hand, if the LTE component at the UE 201 is coexisting with a GNSS component, the Possible Link parameter can be set to "DL" so that the LTE component can receive messages in the DL while the GNSS component receiver is enabled. As will be appreciated, the LTE component at the UE 201 sends the request message to the eNB 202, so the LTE component must either be "on" or at least activated in an "On-interval" during coexistence mode.

The eNB 202 responds by sending a response message at signal flow 2.2 (e.g., CoEXIST-RSP) in a downlink transmission to the UE 201. In general terms, the response message 2.2 may specify the chosen solution (e.g., FDM or TDM) from the eNB 202 to restore communication with the eNB in a coexistence mode of operation. In other embodiments, the response message 2.2 may include signal control parameters defining a coexistence mode of operation with a start time, end time, and alternating intervals of operation for the LTE and non-LTE components which are defined by LTE on-intervals, non-LTE on-intervals, and one or more off-intervals which may be inserted into an LTE on-interval for purposes of temporarily reducing the extent of the LTE on-interval to allocate resources to non-LTE components. Thus, the response message 2.2 may accept or modify the proposed coexistence parameters from the UE's request message by returning a set of (counter-proposed) coexistence parameters defining a coexistence mode of operation with a start time, end time, and alternating intervals of operation for the LTE and non-LTE components. For example, the CoExist-RSP message may specify a Start Time Offset, Keeping Time, LTE On-interval, non-LTE On-interval, LTE Off-interval, Possible Link, and Action field set to "1." The response message 2.2 may configure the coexistence parameters as absolute or delta configuration values. With an absolute value configuration, the eNB 202 sends all related coexistence parameters in the response message 2.2, but with a delta value configuration, the eNB 202 only sends the coexistence parameters in the response message 2.2 that are different from the request message 2.1.

Based on the coexistence parameters in the response message received by the UE 201, the LTE component may enter into a coexistence operation mode, beginning at the Start Time Offset 210 and continuing until expiration at the Keeping Time 218, with alternating LTE On-intervals 212, 216 (during which the LTE component is enabled) and Off-intervals 214 (during which the non-LTE component is enabled). In addition and as described more fully below, the duration of one or more of the On-intervals 212, 216 may be temporarily reduced or shortened by inserting one or more LTE off-intervals (not shown).

During the coexistence mode, the LTE component at the UE 201 may optionally send an update message 2.3 to the eNB 202 to request that the duration of the coexistence operation mode be extended or terminated. In selected embodiments, the update message 2.3 is a separate message (e.g., CoExistDeact-REQ message) received at the eNB 202 which seeks to deactivate or extend the coexistence operation mode, such as by terminating or extending the Keeping Time. In other embodiments, the update message uses the first request message (CoExist-REQ message) which has the Action field set to "0." In either case, the update message 2.3 may include update parameters, such as Start Time Offset and an Action field reset to "0," where the updated Start Time Offset value specifies the new end point or Keeping Time value for the coexistence operation mode.

The eNB 202 responds to the update message 2.3 by sending an update response 2.4 during an available On-interval. In selected embodiments, the update response 2.4 is a separate message (e.g., CoExistDeact-RSP message), while in other embodiments, the update message uses the first response message (CoExist-RSP message) which has the Action field reset to "0." With the update response message 2.4, the coexistence operation mode may be deactivated or extended depending on the eNB status, such as by terminating or extending the Keeping Time. And while the update response 2.4 is shown as being sent in response to the update message 2.3, the update response 2.4 may be sent in unsolicited manner without receiving an update message. For example, the update message 2.4 can be sent without solicitation if the eNB 202 determines that the coexistence operation mode requires extension or early termination. Once the Keeping Time 218 expires, the LTE component in the UE 201 and the eNB 202 may return to normal mode where the LTE component is enabled and the non-LTE component is disabled and turned-off I. Buffer Status Reporting To allocate efficient TDM time patterns, especially when providing HARQ process reservation solutions, the eNB must have accurate traffic volume for the LTE and non-LTE components. Typically, the eNB generates and sends a final time pattern (e.g. subframe reservation pattern) to the UE based which gives priority to LTE traffic, but to avoid conflicts between LTE and non-LTE components, the time pattern should take into account the amount of traffic for DL and UL of the LTE component. While the eNB is able to measure the DL traffic volume for the LTE component during IDC operations, the eNB is not able to measure the UL traffic volume. If the eNB overestimates the amount of UL traffic for LTE component, the resulting time pattern can give higher interference and lower opportunities to DL reception at non-LTE component. Conversely, if the eNB underestimates the amount of UL traffic for LTE component, the resulting time pattern can give higher interference and lower opportunities to DL reception at the LTE component. By providing accurate information to the eNB about the amount of UL traffic for LTE component, the eNB can efficiently allocate the DL and UL subframes for LTE component.

Figure 3:
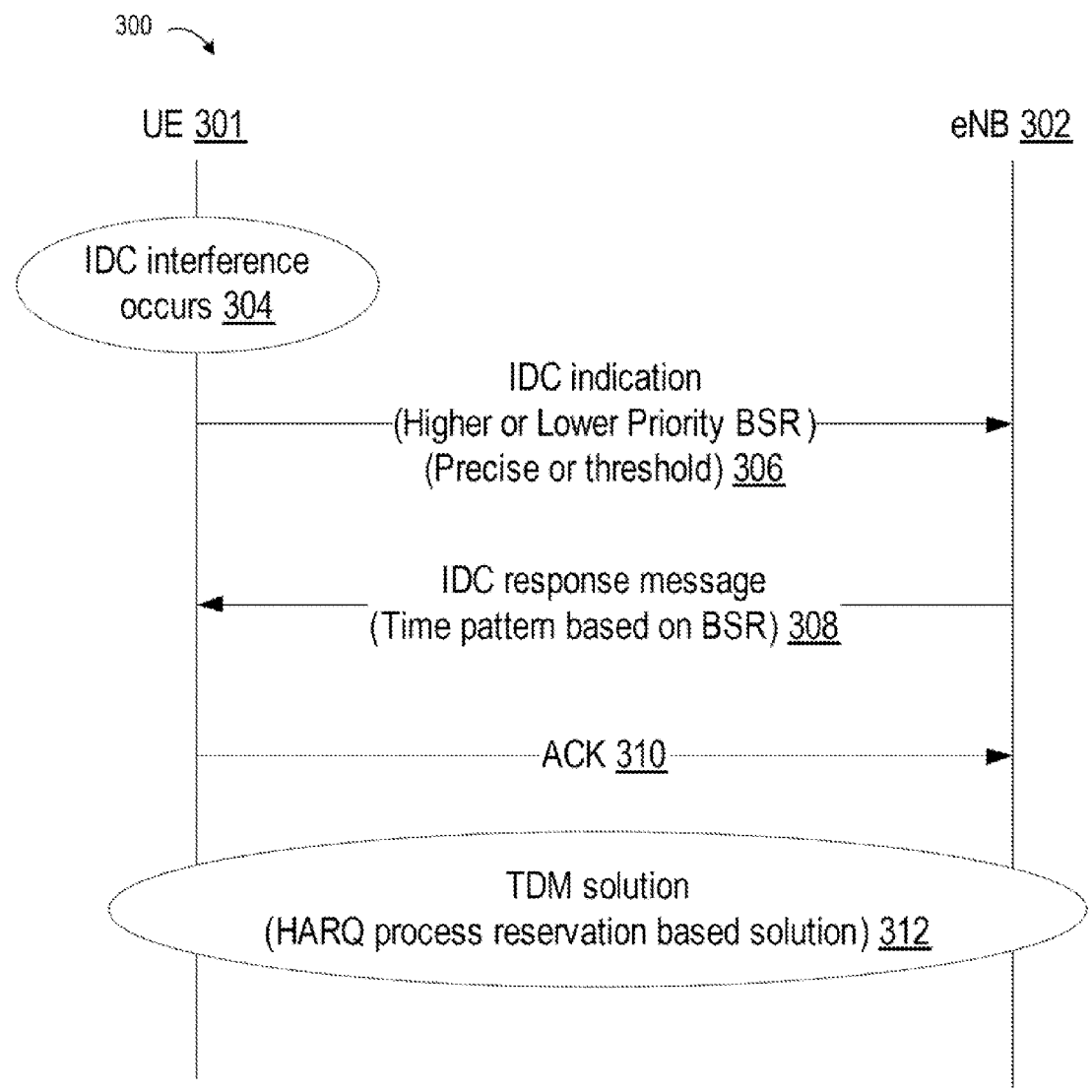
FIG. 3 is a signal call flow diagram illustrating procedures for buffer status reporting for in-device coexistence interference operation in accordance with selected embodiments.

To illustrate the operation for reporting the buffer status to let the eNB know the UL transmission status of LTE component, reference is made to FIG. 3 which depicts a signal call flow diagram 300 illustrating procedures for buffer status reporting for in-device coexistence interference operation in accordance with selected embodiments. As depicted, the illustrated flow begins at step 304 when IDC interference occurs within the UE 301 which is equipped with LTE and non-LTE components in the same platform. At step 306, the UE 301 sends an IDC indication message 306 (e.g., RRC signaling message) to the eNB 302 indicating that there is in-device coexistence interference. As indicated, there can be one or more buffer status reports included in the IDC indication message 306 which allow the UE to convey uplink transmission status information for different radio components, such as a high priority LTE component and a lower priority BT component. Though the buffer status reports may be included in the IDC indication message 306 after detecting IDC interference, there are other possible triggers for sending buffer status reports. For example, a buffer status report may be triggered whenever data arrives for a logical channel which has a higher priority than the logical channels whose buffers previously contained data. In addition or in the alternative, buffer status reports may be triggered whenever a predetermined time period has elapsed since the last transmission of a buffer status report. In addition or in the alternative, buffer status reports may be triggered whenever the serving cell changes.

While the IDC indication message 306 may include any desired parameters or information, in selected embodiments, the IDC indication message 306 includes one or more buffer status reports to notify the eNB 302 about the UL transmission status for one or more radio components (e.g., LTE component or non-LTE component) at the UE 301. In each buffer status report, the UE 301 may signal the amount of residual data information in the UL transmission buffer (e.g. LTE and non-LTE components) in terms of a specific quantitative measure of the amount of data in the UL buffer (i.e., percentage of the buffer level or unit of buffer size), an indication of whether the amount of data in the UL buffer has reached a threshold, some combination of the foregoing, or other appropriate indication. By providing a specific quantitative measure of the data volume in the UL buffer for a radio component (e.g., LTE and non-LTE components), the buffer status report provides precise data volume information to the eNB 302, but there may be an associated message overhead cost with providing such a specific quantitative data measure. To reduce the message overhead, the UE 301 may be configured to include in the buffer status report a specific quantitative measure of the amount of data in the UL buffer only when a predetermined buffer level is exceeded, but to otherwise not include a buffer status report in the IDC indication message 306. To further reduce the message overhead, the UE 301 may be configured to include in the buffer status report a threshold level indication (i.e., over a threshold level or percentage of the buffer level) specifying whether the amount of data in the UL buffer exceeds a predetermined threshold. The threshold level indication may provide a coarse indication of the UL buffer data volume without conveying detailed information of UL buffer, but may significantly reduce the message overhead. Thus, if the level of buffer status exceeds the predetermined threshold level, a "threshold over" indication may be transmitted when the UE 301 sends IDC indication message 306. Otherwise, the UE 301 may not include a buffer status report in the IDC indication message 306. The buffer status report may also be provided as a hybrid of the foregoing. For example, if the contents of the UL transmission buffer (e.g., LTE and non-LTE components) are below the predetermined threshold, the buffer status report may signal the specific quantitative measure of the amount of data in the UL buffer because the buffer is not overloaded and can be controlled based on an amount of residual data. However, if the contents of the UL transmission buffer meet or exceed the predetermined threshold, the buffer status report may provide a threshold level indication to signal that the overload case is urgent and does not need to report actual buffer size to quickly decrease the buffer size.

As will be appreciated, one or more threshold levels can be permanently set as system parameters for use in controlling and conveying how the buffer status reports signal the amount of residual data information in the UL transmission buffer. Alternatively, the threshold level(s) can be flexibly set with one or more RRC signaling messages or broadcast messages such as SIBs. If the scheduling operation at the eNB 302 is more flexible and available, the eNB 302 can give a lower level of threshold so that the UE 301 can report BSR information even in it has not overload or urgent case for sending LTE UL traffic.

By receiving buffer status reports indicating the amount of data available for transmission in the uplink buffer(s) at the UE 301, the eNB 302 is able to make more intelligent allocation decisions when generating the TDM time patterns. In the resource allocation process, the eNB 302 may consider the QoS requirements of each configured radio bearer, select the size of the MAC PDU, and then allocate the UL radio resources over the UL-SCH based on the contents of buffer status reports. In this way, the eNB 302 can effectively allocate the DL and UL subframe pattern for LTE and non-LTE components based on buffer status, which may be based, at least in part, on the reported volume of uplink traffic from the UE 301. As will be appreciated, buffer status reports can be provided not only for UL buffers associated with higher priority LTE components, but also for UL buffers associated with lower priority radio components (e.g., non-LTE components). The additional buffer status reports enable the eNB 302 to balance and fairly assign the time slot for LTE UL and time slot for non-LTE UL where IDC interference happens. If the eNB 302 can know the DL transmission status of the non-LTE (e.g. based on the BSR from non-LTE access point to the UE 301 which is reported back to the eNB 302), the eNB 302 can also balance and fairly assign the time slot for LTE uploading and time slot for non-LTE downloading.

Once the eNB 302 determines a resource allocation, such as by determining a TDM time pattern based on the reported buffer status information, the resource allocation is provided to the UE 301 in the IDC indication response message 308. In response, the UE 301 sends an ACK message 310 to the eNB 302 to confirm the resource allocation. The ACK message may be HARQ-ACK message or L3 RRC message. After acknowledging receipt of the response message 308 (with ACK message 310), the UE 301 and eNB 302 can resume normal operation using the assigned resource allocation at step 312.

Figure 4:
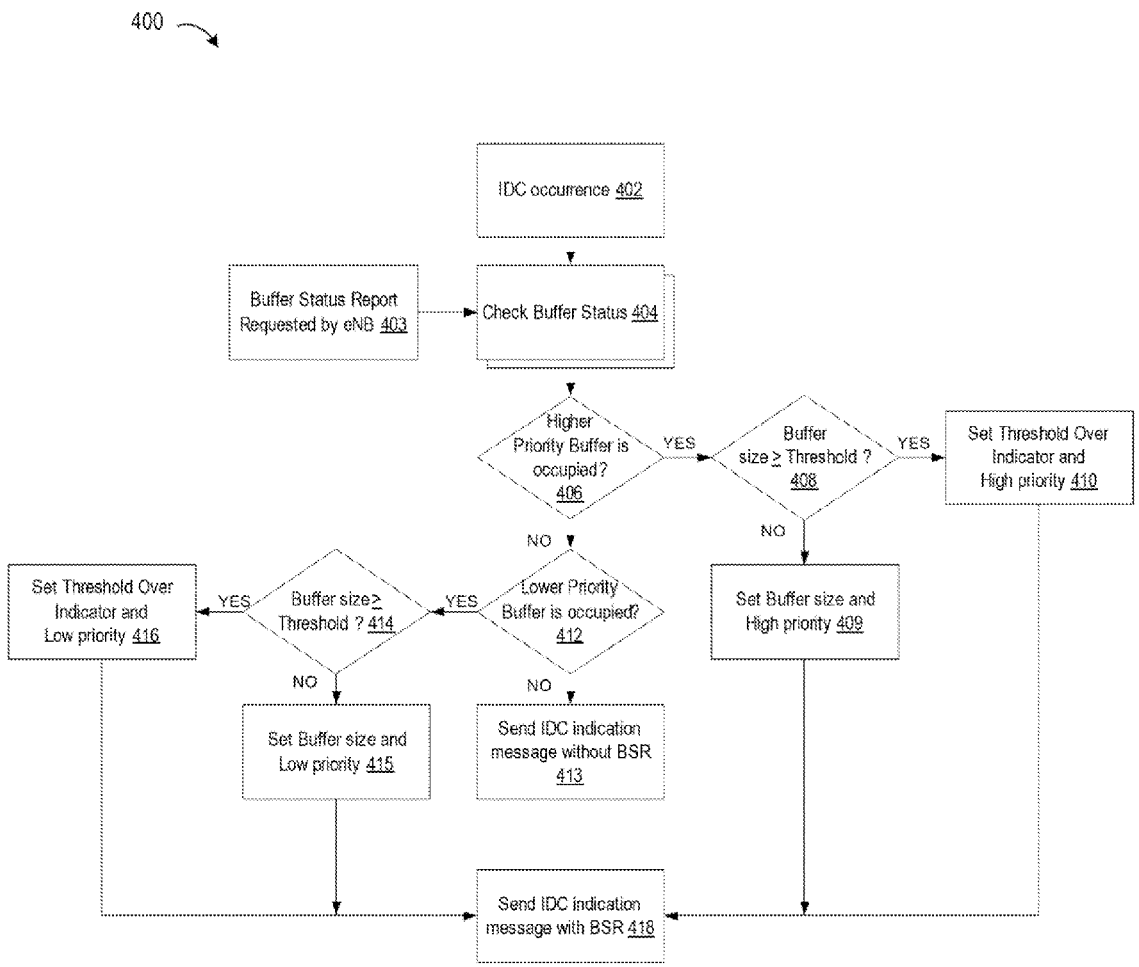
FIG. 4 illustrates a flow chart illustration of the buffer status reporting procedures for in-device coexistence interference operation in accordance with selected embodiments.

To illustrate selected example embodiments of the process for using buffer status reports to convey UL buffer status and traffic status at the UE device, reference is made to FIG. 4 which depicts a flow chart illustration 400 of the buffer status reporting procedures for in-device coexistence interference operation in accordance with selected embodiments. As depicted, the buffer status reporting procedure 400 uses a hybrid buffer status reporting mechanism which begins when the UE device, which is equipped with LTE and non-LTE components in the same platform, detects the existence of in-device coexistence interference (at step 402), or when the eNB device requests a buffer status report (at step 403). As indicated at step 402, the buffer status reporting process can begin whenever the UE device sends IDC indication message, even if there has been no request from the eNB. Alternatively and as indicated at step 403, the buffer status reporting process can begin when the eNB device requests the BSR information from the UE device.

At step 404, the UE device checks the buffer status to determine the amount of traffic contained in one or more uplink buffers. For example, a first UL buffer may be used for high priority transmissions by an LTE component, while a second UL buffer may be used for lower priority transmissions by a non-LTE component.

If the higher priority buffer is occupied (affirmative outcome to decision block 406), the UE device compares the amount of data in the higher priority UL buffer with a threshold value (at step 408). If the amount of buffer data is equal or greater than threshold (affirmative outcome to decision block 408), the UE device sets the "threshold over" indicator and also sets a high priority indicator (step 410) for inclusion in the buffer status report portion of the IDC indication message (step 418). On the other hand, if the amount of buffer data does not meet the threshold requirement (negative outcome to decision block 408), the UE device may specify the quantitative value of the buffer data and set a high priority indicator (step 409) for inclusion in the IDC indication message (step 418). Alternatively, the UE device sends the IDC indication message without the buffer size information and higher priority indicator when the lower priority buffer size is less than the threshold (step 418).

The same process may be repeated for other uplink buffers. For example, upon determining that the higher priority buffer is not occupied (negative outcome to decision block 406), the UE device checks the lower priority buffer to see if it is occupied (step 412). If lower priority buffer is not occupied (negative outcome to decision block 412), the UE device sends IDC indication message without BSR information (step 413). But if the lower priority buffer is occupied (affirmative outcome to decision block 412), the UE device compares the amount of data in the lower priority UL buffer with a threshold value (step 414). If the amount of buffer data is equal or greater than threshold (affirmative outcome to decision block 414), the UE device sets the "threshold over" indicator and also sets a low priority indicator (step 416) for inclusion in the buffer status report portion of the IDC indication message (step 418). Otherwise, the UE device sends the IDC indication message with the buffer size and lower priority indicator (step 415). Alternatively, the UE device sends the IDC indication message without the buffer size information and lower priority indicator when the lower priority buffer size is less than the threshold (step 418).

Though the buffer status report(s) can be sent with the IDC indication message, there are other message signaling options available to provide buffer status reports to the eNB device. For example, buffer status report information can be transmitted by MAC CE or normal RRC signalling message from the UE device. In addition, buffer status information could be instantaneous, averaged or filtered information of the traffic volume to avoid frequent reporting to the eNB.

This buffer status reporting procedures disclosed herein can be effectively applied to a HARQ process reservation scheme used to provide a TDM solution for IDC interference since the UL buffer status information of LTE component will be very useful information to assist making decisions at the eNB device on how to allocate the UL and DL subframes resources for LTE and non-LTE component. In other embodiments, updated averaged buffer status reports from the UE device allow reservations updates to be made periodically, and may also be used by the eNB to generate more precise TDM pattern allocation to the UE. As previously noted, buffer status information could be instantaneous, averaged or filtered information of the traffic volume to avoid frequent reporting to the eNB.

An IDC indication message could be newly created to indicate the in-device coexistence interference and BSR information. Alternatively, an existing RRC message or MAC CE method could be used for this purpose if the same information elements are added on the message. Attached at the Appendix is an example message structure including proposed changes to the existing MeasurementReport message in TS36.331 to include proposed buffer status reporting operation.

II. Off-Interval Insertion into on-Interval

As mentioned above, Discontinuous Reception (DRX) based solutions may be used to avoid in-device coexistence interference between different radio technologies deployed in adjacent bands on the same device. To this end, radio resource management mechanisms (RRM) and signaling procedures may be used to provide a coexistence operation mode by controlling and separating the LTE signaling and the non-LTE signaling, thereby establishing a time division multiplexing-based pattern solution in which there is no coexistence interference. The timing pattern may be provided by the eNB as an alternating sequence of On-intervals for the different radio components. For example and as illustrated in FIG. 2, the timing pattern includes an alternating sequence of LTE on-intervals 212, 216 and non-LTE on-intervals 214. During an LTE On-interval 212, the LTE component transmits and receives the signal with the eNB and the non-LTE components are not active, and during a non-LTE On-interval 214, the non-LTE component transmits and receives the signals with its base station (e.g., Access Point for WiFi and Master node for BT) and the LTE components are not active. While this alternating sequence of on-intervals does provide an in-device coexistence mode of operation, the actual data transmission requirements from LTE and non-LTE radio components rarely match up with the initially allocated on-intervals which are coarsely allocated by the eNB. This mismatch can occur with burst data traffic to be transmitted by a radio component when the coarse On-interval allocations fail to fully or efficiently transmit the bursty data traffic.

To provide greater flexibility and efficiency in the allocation of radio resources, there is disclosed herein a method and apparatus for temporarily shortening the duration of the initial On-interval allocated by eNB in response to one or more trigger events relating to the amount of traffic requirements for the LTE and non-LTE components. The interval adjustments may be used to temporarily provide greater radio resource access to a first radio component (e.g., non-LTE component) by inserting one or more off-intervals into the allocated on-interval for a second radio component (e.g., LTE component). In an example implementation, burst data traffic from a non-LTE component is transmitted during the on-interval for the LTE component by inserting one or more off-intervals into the LTE on-interval to provide more flexible time resource allocation to the non-LTE component to increase the traffic opportunities for the non-LTE component.

In order to measure or control the insertion of off-intervals for a first radio component, a Coexistence Timer may be maintained (e.g., at the UE, eNB or both) to count the number of time extensions effectively provided to the second radio component to make sure it does not exceed a specified timer limit value which may be set by the signaling message(s) or pre-configured as a system parameter. In operation and as shown below in Table 3, the Coexistence Timer may include a specified timer limit, as well as one or more start events and end events.

TABLE 3

Events for On-interval extension

| Timer | Units | Extension Start | Extension End |
|---|---|---|---|
| Coexistence Timer | # of consecutive PDCCH-subframe or time | 1) PDCCH indicates an DL or UL data transmission 2) Waiting UL grant 3) Pending Ack/Nack transmission | 1) Reach the Max. Ratio 2) No Data indication on this subframe 3) No pending Ack/Nack on this subframe |

In the example depicted in Table 3, the Coexistence Timer has a timer limit that is specified with a Units value (e.g., the number of consecutive PDCCH-subframes or time duration). The Coexistence Timer may start when a specified Start event occurs, such as (1) when the PDCCH indicates that there is a downlink or uplink data transmission, or (2) when the UE is awaiting a uplink grant, or (3) when there is a pending ACK/NACK signal, or (4) when a RACH procedure is pending, or (5) when there is pending scheduling request sent on PUCCH. Similarly, the Coexistence Timer may stop or end when a specified End event occurs, such as 1) when the number of units reaches the Maximum Ratio, or 2) when there is a No Data indication on this subframe, or 3) when there is no pending Ack/Nack on this subframe.

It may also be useful to monitor and control the number of off-intervals being inserted into an initially allocated on-interval. To this end, triggering events and end events, such as listed below in Table 4, are defined for Off-interval insertion into the LTE On-interval. Generally speaking, insertion of an off-interval may be initiated when the non-LTE traffic is ready for transmission and there are no LTE traffic requirements, provided that the on-interval has been allocated for a minimum time duration. Conversely, off-interval insertion may end when the trigger event conditions no longer apply.

time duration that is defined with reference to the ReCoexistence timer value. This timer value may be implemented at the UE device with any desired timing scheme, including but not limited to measuring a minimum count number of PDCCH subframes or an actual minimum time flow requirement for the on-interval. In operation, the ReCoexistence timer may be set whenever Off-interval insertion condition is triggered.

When the ReCoexistence timer is expired, the off-interval may be inserted into the On-interval provided that there is a trigger event for initiating insertion of an off-interval. For example, column 3 in Table 4 lists a number of initiation events for inserting an off-interval into an initially allocated LTE on-interval. These trigger events reflect conditions where non-LTE component traffic is ready for transmission and there is no pending LTE component behavior, such as (1) when there is no PDCCH indication that there is a downlink or uplink data transmission, or (2) when there is no UE is awaiting an uplink grant, or (3) when there is no pending ACK/NACK signal. As for determining when to conclude the insertion of off-interval(s) into the LTE on-interval, this may occur when there is no additional non-LTE traffic ready for transmission or there is otherwise LTE traffic ready for transmission. Examples of conditions for ending the Off-interval insertion are shown in column 4, such as (1) when the PDCCH indicates that there is a downlink or uplink data transmission, or (2) when the UE is awaiting a uplink grant, or (3) when there is a pending ACK/NACK signal, or (4) when there is no non-LTE traffic ready for transmission.

The duration and extent of the inserted off-interval(s) may be defined with reference to an initial insertion unit, which is the duration of the initial off-interval being inserted into the on-interval. In selected embodiments, the initial insertion unit may be measured as the initial time or number of PDCCH subframe initially allocated to non-LTE component as a minimum guaranteed time interval for non-LTE component. If warranted by traffic conditions and/or system requirements, additional off-intervals may be inserted into the initial on-interval by subsequently inserting another initial insertion unit after resetting the ReCoexistence timer, and/or by inserting an extension of the insertion unit which is computed as a multiple of the initial insertion unit. The value of the multiple used to multiply the initial insertion unit into an extended off-interval insertion unit can be programmatically controlled, based on system and/or traffic requirements.

While the example provided in Table 4 applies to the insertion of an off-interval into an LTE on-interval, it will be appreciated that the off-interval timer values, trigger events

TABLE 4

Events for Off-interval insertion

| Parameters | Units | Off-interval Insertion - ISM traffic ready and no LTE behavior | Off-interval End - No ISM traffic ready or LTE behavior |
|---|---|---|---|
| Initial insertion Unit | PDCCH-subframe or time | 1) No PDCCH indicates an DL or UL data transmission, 2) No Waiting UL grant and 3) No Pending Ack/Nack transmission | 1) PDCCH indicates an DL or UL data transmission, 2) Waiting UL grant or 3) Pending Ack/Nack transmission 4) No non-LTE traffic ready |
| Extension of insertion Unit | Multiple times of initial insertion unit | 1) For example, doubling of previous insertion unit time or 2) Indicated by eNB | |
| ReCoexistence Timer | PDCCH-subframe or time | Timer for declaring of Off-interval insertion into On-interval | |

Figure 5:
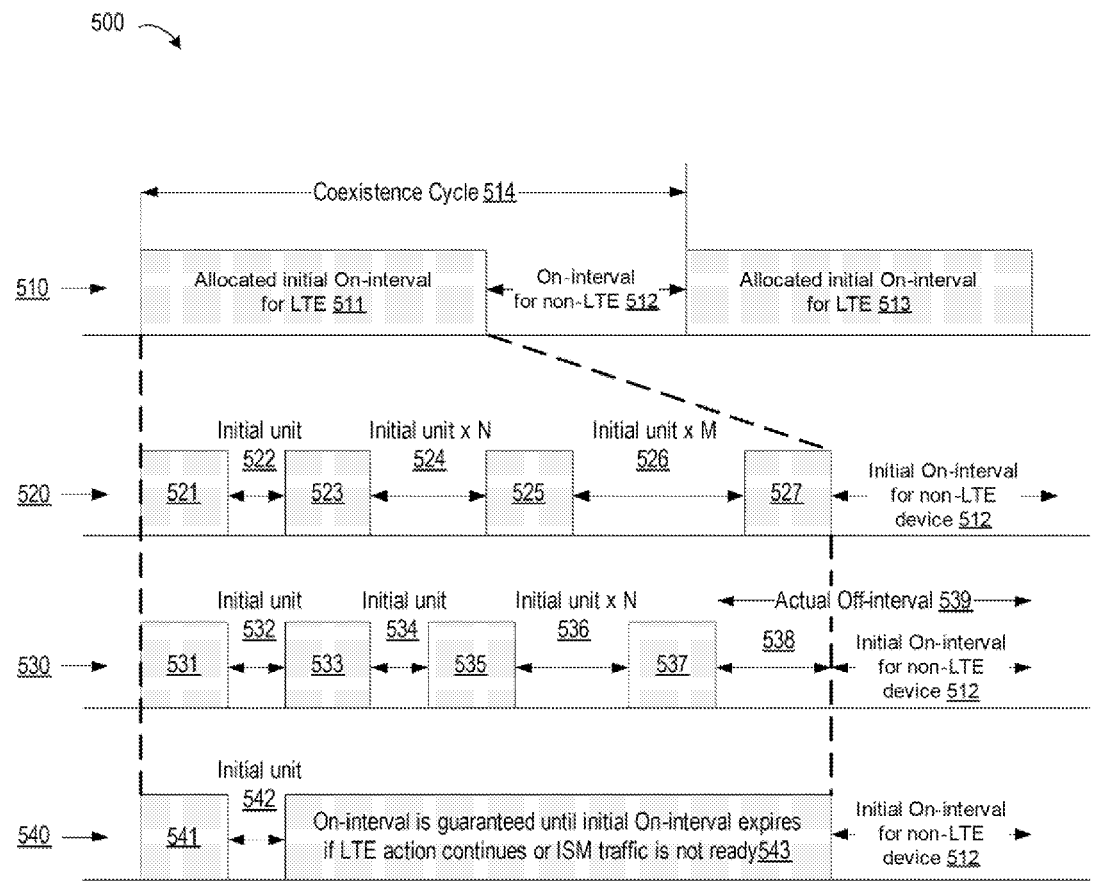
FIG. 5 illustrates different timelines in which allocated on-intervals are modified with one or more inserted off-intervals for managing in-device coexistence interference in accordance with selected embodiments.

In the example depicted in Table 4, an off-interval may be inserted after the on-interval has been "on" for a minimum and end events can also be defined for inserting off-intervals into non-LTE on-intervals, thereby providing additional transmission resource access to LTE components. Examples of possible off-interval insertion patterns are shown in FIG. 5 which depicts different timelines 510, 520, 530, 540 in which allocated on-intervals are modified with one or more inserted off-intervals for managing in-device coexistence interference in accordance with selected embodiments.

Starting with the first timeline 510, there is illustrated an initial or default coexistence operation mode in which an initial allocation of an LTE on-interval 511 and non-LTE on-interval 512 are set based on the coexistence parameters in the response message received by the UE device. The coexistence parameters may specify a start time parameter for beginning the coexistence operation mode, a keeping time parameter for controlling the duration for the coexistence operation mode. The coexistence parameters may also include parameters for defining the alternating LTE on-intervals 511, 513 (during which the LTE component is enabled) and non-LTE on-intervals 512 (during which the non-LTE component is enabled). As will be appreciated, the alternating on-intervals may be defined by specifying the duration of the LTE on-interval 511 and non-LTE on-interval 512, or by specifying the duration of the LTE on-interval 511 and the coexistence cycle 514. Regardless of how the initial on-intervals are defined, they may not match up with the actual traffic conditions if, for example, there is non-LTE traffic ready for transmission during the LTE on-interval 511 when there is no LTE traffic to be transmitted.

To adjust the initial allocation of the LTE on-interval so that non-LTE traffic can be sent, an off-interval may be inserted. This may be precipitated by, e.g., a trigger event for off-interval insertion which may be detected at the UE device. The trigger event can be any set of detected conditions indicating that there are no LTE events pending, and that non-LTE traffic is ready for transmission. In addition, the UE device may initiate a timer (e.g., ReCoexistence timer) to make sure that the LTE on-interval has at least a minimum time duration. The timer can be initiated when a trigger event is detected, or when the on-interval starts.

Once a trigger event is detected and the timer has expired, an off-interval may be inserted into the on-interval using any desired insertion scheme. For example, the second timeline 520 shows that an initial off-interval unit 522 is inserted into the initially allocated LTE on-interval 511. The duration of the initial off-interval unit may be allocated by the eNB device or predetermined as a system parameter. As a result, the initially allocated LTE on-interval 511 is now truncated into a first abbreviated on-interval 521, followed by a first off-interval 522 which is inserted after the timer expires without any LTE events being detected if there is a trigger event (e.g., there is non-LTE traffic ready for transmission). The duration of the first off-interval 522 may be defined with reference to an initial insertion unit 522, after which time the LTE on-interval is turned back on, provided that initial non-LTE on-interval 512 has not started. The foregoing process may be repeated to form a plurality of abbreviated on-intervals 523, 525, 527 which are separated by one or more inserted off-intervals 524, 526 using any desired spacing scheme until the non-LTE on-interval 512 arrives.

One example of a spacing scheme for inserting off-intervals is shown in timeline 520 where each successive off-interval is incremented by the value of the initial off-interval unit, so that the second off-interval 524 is twice as long as the initial off-interval 522, the third off-interval 526 is three times as long as the initial off-interval 522, and so on, but the same trigger event and timer requirements apply before insertion of any additional off-intervals. As a result, the second abbreviated on-interval 523 may be truncated by the insertion of a second off-interval 524 only if the timer expires without any LTE events being detected and if a trigger event is detected (e.g., there is non-LTE traffic ready for transmission). With the duration of the second off-interval 524 being extended to N=2 times the initial off-interval value, the recovery of the LTE on-interval by the start of the third abbreviated on-interval 525 may be further delayed, provided that initial non-LTE on-interval 512 has not started. Likewise, the third abbreviated on-interval 525 may be truncated by the insertion of a third off-interval 526 if the timer expires without any LTE events being detected and if a trigger event is detected (e.g., there is non-LTE traffic ready for transmission). As shown, the duration of the third off-interval 526 is extended to M=3 times the initial off-interval value to further delay the start of the fourth abbreviated on-interval 527, provided that initial non-LTE on-interval 512 has not started. In the foregoing example, the multiple values N and M are integer values, but it will be appreciated that non-integer values can also be used as multiplier values when extending or shortening individual off-intervals. Also, these multiple values (e.g., N, M) can be allocated by the eNB device or predetermined as a system parameters (e.g. doubling or incrementing the previous insertion time, etc.). The process of inserting off-intervals using any desired insertion scheme may be repeated until the initially allocated LTE on-interval 511 is exhausted and the non-LTE on-interval 512 begins. With the spacing scheme example shown in timeline 520, each inserted off-interval progressively lengthens the duration of each off-interval, though it will be appreciated that subsequent off-intervals can also be shorter than a preceding off-interval if desired. This increased lengthening of the transmission opportunities for the non-LTE components can provide a good match for data patterns where the LTE component is largely inactive, while still preserving a minimum opportunity for LTE component transmission. However, it will be appreciated that different off-interval insertion schemes can be used. For example, upon detecting an off-interval insertion trigger event, the eNB could configure the UE device to drop the LTE on-interval, but the eNB would need to provide signaling to move the UE device back to normal state with "back to normal" indicator via MAC CE.

Another example of a spacing scheme for inserting off-intervals is shown in timeline 530 where a different pattern of off-intervals are inserted, which may also be subject to trigger event and timer requirements. As depicted, an initial off-interval unit 532 is inserted into the initially allocated LTE on-interval 511 after the timer expires without any LTE events being detected if there is a trigger event, resulting in a first abbreviated on-interval 531, followed by a first off-interval 532. Again, the duration of the initial off-interval unit 532 may be allocated by the eNB device or predetermined as a system parameter. Provided that the initial non-LTE on-interval 512 has not started, the LTE on-interval 511 may be recovered by the start of the second abbreviated on-interval 533, and then truncated again by the insertion of a second off-interval 534 if the timer expires and a trigger event is detected. As depicted, the duration of the second off-interval 534 is not extended, and may be the same as the duration of the initial off-interval 532. The process is repeated to form the third abbreviated on-interval 535 which is truncated by the third off-interval 536, though in this instance, the duration of the third off-interval 536 is extended by a multiple of N (e.g., N=2) times the initial off-interval value, where the multiple value N can be allocated by the eNB device or predetermined as a system parameters. With this extended off-interval 536, the recovery of the LTE on-interval by the start of the fourth abbreviated on-interval 537 is further delayed, provided that initial non-LTE on-interval 512 has not started. At this point in the spacing scheme shown in timeline 530, the eNB could configure the UE device to drop the LTE on-interval, thereby creating an additional off-interval 538 during which non-LTE components could transmit signals. However, the eNB device may need to provide signaling to move the UE device back to normal state with "back to normal" indicator via MAC CE.

In yet another example of a spacing scheme shown in timeline 540, a single off-interval unit 541 is inserted into the initially allocated LTE on-interval 511 after the timer expires without any LTE events being detected if there is a trigger event, resulting in a first abbreviated on-interval 541, followed by a first off-interval 542. Again, the duration of the initial off-interval unit 542 may be allocated by the eNB device or predetermined as a system parameter. Provided that the initial non-LTE on-interval 512 has not started, the LTE on-interval is recovered by the start of the second abbreviated on-interval 543 and extends until the start of the initial non-LTE on-interval 512. In this way, the initial LTE on-interval 511 is recovered and guaranteed until the initial LTE on-interval 511 expires for any subsequent LTE behavior. Of course, during the on-interval 543, an off-interval could be inserted upon detection of a trigger event after expiration of the timer.

An IDC response message could be newly created to indicate or control the insertion of off-intervals in an initial allocation of on-intervals at the UE device. Alternatively, an existing RRC message or MAC CE method could be used for this purpose if the same information elements are added on the message. Attached at the Appendix is an example message structure including proposed changes to the existing RRCConnectionReconfiguration message in TS36.331 to specify operations for inserting one or more off-intervals in an initially allocated on-interval.

By now it should be appreciated that there is disclosed herein methods for use in a radio access network (eNB) by user equipment (UE) having a first radio technology component (e.g., an LTE component) and a second radio technology component (e.g., a GNSS or ISM) on a single platform. In addition, computer program products are disclosed that may include a non-transitory computer readable storage medium having computer readable program code embodied therein with instructions which are adapted to be executed to implement a method for operating user equipment (UE) and/or a radio access network (eNB) in a coexistence mode, substantially as described hereinabove. In selected embodiments, a buffer status reporting operation is provided which may be used, e.g., with H-ARQ reservation process procedures for TDM time pattern request and allocation, where the buffer status reports may be sent by the UE with each IDC indication, or in response to eNB requests. For one or more buffer priorities, the buffer status report may convey a quantitative measure of the uplink buffer contents and/or a threshold indication of whether the buffer contents meet a threshold requirement. In other selected embodiments, one or more off-intervals into an on-interval for a first radio component to allow a second radio component to transmit during the inserted off-interval, subject to predetermined trigger events and conditions.

Figure 6:
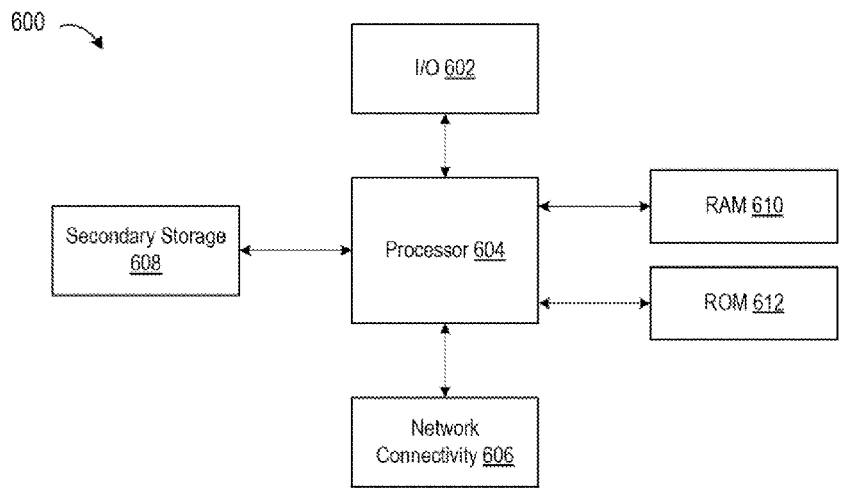
FIG. 6 illustrates an example computer system that may be suitable for implementing the in-device coexistence interference at a user device or network node.

The user devices and network elements described herein may include any general or special purpose computer with sufficient processing power, memory resources, and network throughput capability to handle the necessary workload placed upon it. FIG. 6 illustrates an example computer system 600 that may be suitable for implementing one or more embodiments disclosed herein. The computer system 600 includes a processor 604 (which may be referred to as a central processor unit or CPU) that is in communication with input/output (I/O) devices 602, network connectivity devices 606, an optional secondary storage 608, random access memory (RAM) 610, and read only memory (ROM) 612. The processor may be implemented as one or more CPU chips.

The secondary storage 608 is optionally included, and typically includes one or more disk drives or tape drives used for non-volatile storage of data and/or for over-flow data storage device if RAM 610 is not large enough to hold all working data. Secondary storage 608 may be used to store programs which are loaded into RAM 610 when such programs are selected for execution. The ROM 612 is used to store instructions and perhaps data which are read during program execution. ROM 612 is a non-volatile memory device which typically has a small memory capacity relative to the larger memory capacity of secondary storage. The RAM 610 is used to store volatile data and perhaps to store instructions. Access to both ROM 612 and RAM 610 is typically faster than to secondary storage 608.

I/O devices 602 may include on or more printers, video monitors, liquid crystal displays (LCDs), touch screen displays, keyboards, keypads, switches, dials, mice, track balls, voice recognizers, card readers, paper tape readers, or other well-known input devices.

The network connectivity devices 606 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 606 devices may enable the processor 604 to communicate with an Internet or one or more intranets. With such a network connection, it is contemplated that the processor 604 might receive information from the network, or might output information to the network in the course of performing the above-described method steps. Such information, which is often represented as a sequence of instructions to be executed using processor 604, may be received from and outputted to the network, for example, in the form of a computer data signal embodied in a carrier wave or a non-transitory computer readable storage medium, such as RAM, ROM or other memory storage devices.

Such information, which may include data or instructions to be executed using processor 604 for example, may be received from and outputted to the network, for example, in the form of a computer data baseband signal or signal embodied in a carrier wave. The baseband signal or signal embodied in the carrier wave generated by the network connectivity 606 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 604 executes instructions, codes, computer programs, scripts which it accesses from hard disk, floppy disk, optical disk (these various disk-based systems may all be considered secondary storage 608), ROM 612, RAM 610, or the network connectivity devices 606. While only one processor 604 is shown, multiple processors may be present. Thus, while instructions may be discussed as executed by a processor, the instructions may be executed simultaneously, serially, or otherwise executed by one or multiple processors. In addition or in the alternative, any required processing functionality may be executed by a cryptographic engine or other hardware accelerator circuit (not shown).

Figure 7:
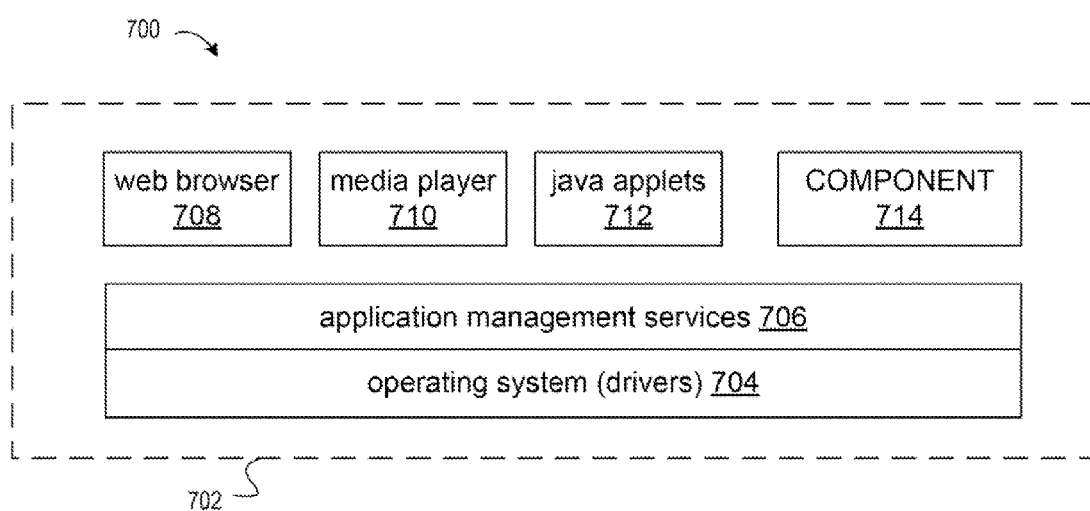
FIG. 7 is a diagram of a software environment that may be implemented on a user agent and/or network node operable for some of the various embodiments.

FIG. 7 is a diagram of a software environment 700 that may be implemented on a communication device and/or network node operable for some of the various embodiments of the disclosure. As illustrated, one or more processing resources at the communication device or network node execute operating system drivers 704 that provide a platform from which the rest of the software operates. The operating system drivers 704 provide drivers for the device hardware with standardized interfaces that are accessible to application software. The operating system drivers 704 include application management services ("AMS") 706 that transfer control between applications running on the device. In UE instances, the software environment 702 includes a web browser application 708, a media player application 710, and Java applets 712 are provided as device applications. The web browser application 708 configures the UE device to operate as a web browser, allowing a user to enter information into forms and select links to retrieve and view web pages. The media player application 710 configures the UE to retrieve and play audio or audiovisual media. The Java applets 712 configure the UE device to provide games, utilities, and other functionality. Finally, the component 714 may provide the in-device coexistence interference management functionality described herein.

Figure 8:
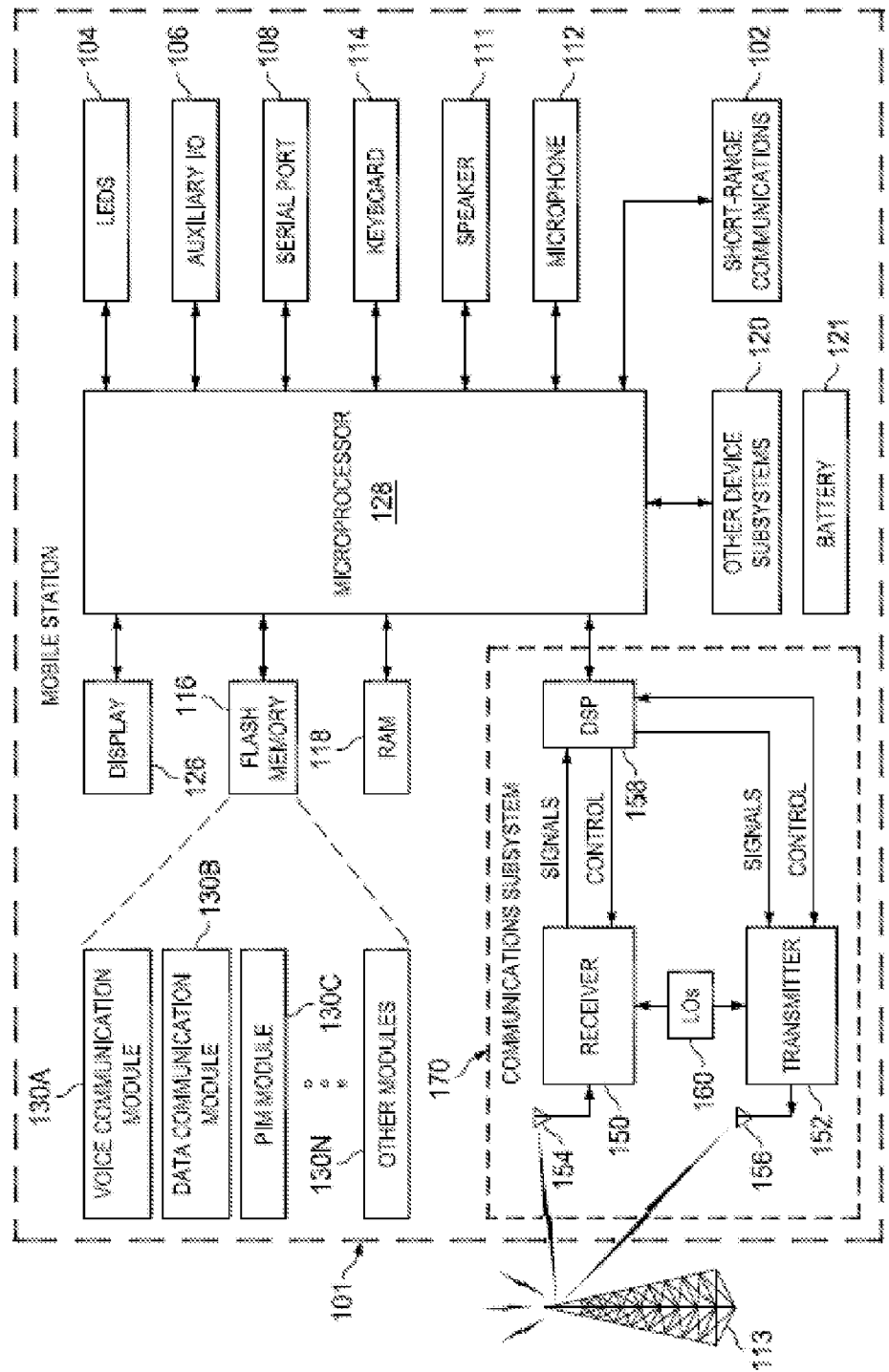
FIG. 8 is a schematic block diagram illustrating exemplary components of a mobile wireless communications device which may be used with selected embodiments.

Referring now to FIG. 8, there is shown a schematic block diagram illustrating exemplary components of a mobile wireless communications device 101 which may be used with selected embodiments. The wireless device 101 is shown with specific components for implementing features described above. It is to be understood that the wireless device 101 is shown with very specific details for exemplary purposes only.

A processing device (e.g., microprocessor 128) is shown schematically as coupled between a keyboard 114 and a display 126. The microprocessor 128 controls operation of the display 126, as well as overall operation of the wireless device 101, in response to actuation of keys on the keyboard 114 by a user.

The wireless device 101 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 101 are shown schematically. These include a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The wireless device 101 may have a battery 121 to power the active elements of the wireless device 101. The wireless device 101 is in some embodiments a two-way radio frequency (RF) communication device having voice and data communication capabilities. In addition, the wireless device 101 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 101 may also be stored to the RAM 118.

The microprocessor 128, in addition to its operating system functions, enables execution of software applications on the wireless device 101. A predetermined set of software applications that control basic device operations, such as a voice communications module 130A and a data communications module 130B, may be installed on the wireless device 101 during manufacture. In addition, a personal information manager (PIM) application module 130C may also be installed on the wireless device 101 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device user's corresponding data items stored or associated with a host computer system. As well, additional software modules, illustrated as another software module 130N, may be installed during manufacture.

Communication functions, including data and voice communications, are performed through the communication subsystem 170, and possibly through the short-range communications subsystem 102. The communication subsystem 170 includes a receiver 150, a transmitter 152 and one or more antennas, illustrated as a receive antenna 154 and a transmit antenna 156. In addition, the communication subsystem 170 includes a processing module, such as a digital signal processor (DSP) 158, and local oscillators (LOs) 160. In some embodiments, the communication subsystem 170 includes a separate antenna arrangement (similar to the antennas 154 and 156) and RF processing chip/block (similar to the Receiver 150, LOs 160 and Transmitter 152) for each RAT, although a common baseband signal processor (similar to DSP 158) may be used for baseband processing for multiple RATs. The specific design and implementation of the communication subsystem 170 is dependent upon the communication network in which the wireless device 101 is intended to operate. For example, the communication subsystem 170 of the wireless device 101 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1x and 1x EV-DO. The communication subsystem 170 may also be designed to operate with an 802.11 Wi-Fi network, and/or an 802.16 WiMAX network. Other types of data and voice networks, both separate and integrated, may also be utilized with the wireless device 101.

Network access may vary depending upon the type of communication system. For example, in the Mobitex™ and DataTAC™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (SIM) card, in order to operate on a GPRS network.

When network registration or activation procedures have been completed, the wireless device 101 may send and receive communication signals over the communication network 113. Signals received from the communication network 113 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 113 are processed (e.g., modulated and encoded) by the DSP 158 and are then provided to the transmitter 152 for digital to analog conversion, frequency up conversion, filtering, amplification and transmission to the communication network 113 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 113 via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 101. In addition, the display 126 may also be utilized in voice communication mode, for example, to display the identity of a calling party, the duration of a voice call, or other voice call related information.

The short-range communications subsystem 102 enables communication between the wireless device 101 and other proximate systems or devices, which need not necessarily be similar devices. For example, the short range communications subsystem may include an infrared device and associated circuits and components, or a Bluetooth™ communication module to provide for communication with similarly-enabled systems and devices.

By now it should be appreciated that there is disclosed herein methods for use in user equipment (UE) comprising a first radio technology component (e.g., an LTE component) and a second radio technology component (e.g., a GNSS or ISM component) on a single platform. In disclosed systems and methodologies, the UE may send a message requesting a coexistence mode for the first and second radio technology components, where the message includes a buffer status report which indicates one or more parameters related to one or more uplink buffers at the UE. The message and buffer status report may be sent on a predetermined basis, such as when the UE sends a coexistence interference indication message to a radio access network (eNB) device, in response to a request from a radio access network (eNB) device, in response to receiving data for a logical channel which has a higher priority than an existing uplink buffer data, at a regular interval after a previous buffer status report was sent, or whenever a serving cell for the UE changes. In selected embodiments, the buffer status report includes a quantitative measure of how much data is available for transmission on one or more uplink buffers at the UE. In other embodiments, the buffer status report includes a threshold signal indication of whether data available for transmission on one or more uplink buffers at the UE meets or exceeds a predetermined threshold level. There may also be hybrid buffer status reports which include a quantitative measure of how much uplink data is available for transmission if the uplink data available for transmission is below a predetermined threshold, but which include a threshold signal indication if the uplink data available for transmission meets or exceeds the predetermined threshold. The UE may subsequently receive a response message comprising one or more control parameters for establishing the coexistence mode based at least in part on the buffer status report, and may then enable the first and second radio technology components with the one or more control parameters to use radio resources on the UE wherein uplink resources are allocated to the first and second radio technology components based at least in part on the buffer status report.

In addition, there is disclosed methods for use in radio access network (eNB) to avoid interference between first and second radio components located on a single platform at a user equipment (UE). In disclosed methodologies, the eNB may receive a buffer status report comprising an uplink traffic volume indication for one or more uplink buffers at the UE, and may subsequently send a response message comprising one or more control parameters for establishing the coexistence mode with a time division multiplex time pattern based at least in part on the buffer status report.

In another form there is disclosed computer program products implemented as a non-transitory computer readable storage medium having computer readable program code embodied therein that is adapted to be executed to implement a method for operating user equipment (UE) in a coexistence mode. As disclosed, the computer program products may include instructions for sending a message comprising a buffer status report which indicates one or more parameters related to one or more uplink buffers at the UE. In addition, the computer program products may include instructions for receiving a response message comprising one or more control parameters for establishing the coexistence mode with a time division multiplex time pattern based at least in part on the buffer status report. The computer program product also includes instructions for enabling the first and second radio technology components with the one or more control parameters to use radio resources on the UE wherein uplink resources are allocated to the first and second radio technology components based at least in part on the buffer status report.

In yet another form, there is disclosed user equipment devices having a first radio technology component (e.g., an LTE component) and a second radio technology component (e.g., a GNSS or ISM component) and methods for operating same. As disclosed, the UE device may receive a message comprising one or more control parameters for establishing first and second signaling intervals for the first and second radio technology components along with one or more off-intervals that can be inserted into the first signaling interval.

The control parameter(s) may include a Start Time parameter specifying a start time for a coexistence mode, a Keeping Time parameter specifying an end time for the coexistence mode, a first on-interval parameter specifying an initial time duration for the first signaling interval, a second on-interval parameter specifying an initial time duration for the second signaling interval, and/or an off-interval parameter specifying a duration of an initial off-interval which may be inserted into the first signaling interval. In response, the UE may insert an initial off-interval in the first signaling interval in response to a predetermined trigger event which may be at least one of a first condition when there has been no traffic activity at the first radio component during a predetermined time period, and a second condition where there is traffic ready for transmission by the second radio component. The UE may also insert a second off-interval after the initial off-interval in the first signaling interval in response to a second trigger event, where the duration of the second off-interval may be the same as, or different from, the duration of the initial off-interval. Subsequently, the UE device may enable the first radio technology component to use radio resources on the UE during the first signaling interval except where one or more off-intervals have been inserted, and may enable the second radio technology component to use radio resources on the UE during the second signaling interval and during the one or more off-intervals inserted into the first signaling interval.

In still yet another form, there is disclosed methods for use in radio access networks (eNB) to avoid interference between first and second radio components located on a single platform at a user equipment (UE). In disclosed methodologies, the eNB may receive a message comprising a buffer status report which may indicate how much data is available for transmission on one or more uplink buffers at the UE, and then send a response message comprising one or more control parameters for establishing one or more off-intervals that can be inserted in at least one of a first and second signaling interval for at least one of the first and second radio technology components.

In another form there is disclosed computer program products implemented as a non-transitory computer readable storage medium having computer readable program code embodied therein that is adapted to be executed to implement methods for operating user equipment (UE) in a coexistence mode. As disclosed, computer program products may include instructions for sending a message comprising a buffer status report which indicates how much data is available for transmission on one or more uplink buffers at the UE. In addition, the computer program products may include instructions for receiving a response message comprising one or more control parameters for establishing one or more off-intervals that can be inserted in first and second signaling intervals for the first and second radio technology components. The computer program products may also include instructions for enabling the first radio technology component with the one or more control parameters to use radio resources on the UE during the first signaling interval without interference to/from the second radio technology component except where one or more off-intervals have been inserted in response to one or more predetermined trigger events, and for enabling the second radio technology component with the one or more control parameters to use radio resources on the UE during the second signaling interval and during the one or more off-intervals inserted into the first signaling interval without interference to/from the first radio technology component.

It should be understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection.

Numerous modifications and variations of the present application are possible in light of the above teachings. It is therefore to be understood that within the scope of the appended claims, the embodiments of the application may be practiced otherwise than as specifically described herein.

Although the described exemplary embodiments disclosed herein are described with reference to a coexistence operation mode whereby different signaling components are separated in time to avoid coexistence interference, the embodiments not necessarily limited to the example embodiments which illustrate inventive aspects that are applicable to a wide variety of signaling schemes and applications. Thus, the particular embodiments disclosed above are illustrative only and should not be taken as limitations, as there may be modifications and practices in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope as defined by the appended claims so that those skilled in the art should understand that they can make various changes, substitutions and alterations without departing from the spirit and scope of its broadest form.

What is claimed is:

1. A method for use in user equipment (UE) comprising first and second radio technology components, comprising:
   sending, to a network component, a message to request a coexistence mode for the first and second radio technology components, the message comprising a buffer status report which indicates one or more parameters related to one or more uplink buffers at the UE, the one or more parameters indicates, to the network component, existing inference between the first and second radio technology components, and the coexistence mode allocates radio resources that reduce the existing inference between the first and second radio technology components;
   receiving, from the network component, a response message identifying a time division multiplexing (TDM) pattern for the first radio technology component for establishing the coexistence mode, wherein the TDM pattern for the first radio technology component is based at least in part on the buffer status report and includes on-intervals and off-intervals for the first radio technology component; and
   enabling the first and second radio technology components with the one or more control parameters to use radio resources on the UE wherein resources are allocated to the first and second radio technology components based at least in part on the buffer status report.

2. The method of claim 1, where the first radio component comprises an LTE component, and where the second radio technology component comprises a Global Navigation Satellite System (GNSS) component or an Industrial, Science and Medical (ISM) component.

3. The method of claim 1, further comprising sending the message when a buffer receives uplink data for a logical channel which has a higher priority than a logical channel for data in an existing uplink buffer or when a serving cell for the UE changes.

4. The method of claim 1, further comprising sending messages at regular intervals.

5. The method of claim 1, where the buffer status report includes a quantitative measure which indicates how much data is buffered in one or more uplink buffers at the UE or comprises an indication of whether data available for transmission on one or more uplink buffers at the UE meets or exceeds a threshold level.

6. The method of claim 1, where sending the message comprises at least one of sending the buffer status report for a high priority uplink buffer at the UE, sending the buffer status report for a low priority uplink buffer at the UE, sending the buffer status report in response to a request from the network component, or sending the buffer status report without being requested by the network component.

7. A method for use in a network component to avoid interference between radio components on a user equipment (UE), comprising:
    receiving, from the UE, a buffer status report comprising one or more parameters related to one or more uplink buffers at the UE, the one or more parameters indicate existing inference between the first and second radio technology components; and
    sending, to the UE, a response message identifying a time division multiplexing (TDM) pattern for the first radio technology component for establishing a coexistence mode, wherein the TDM pattern for the first radio technology component is based at least in part on the buffer status report and include on-intervals and off-intervals for the first radio technology component, the coexistence mode allocates radio resources that reduce the existing inference between the first and second radio technology components.

8. The method of claim 7, where the control parameters allocate downlink and uplink subframes for at least one radio component at the UE.

9. A computer program product comprising a non-transitory computer readable storage medium having computer readable program code embodied therein, said computer readable program code adapted to be executed to implement a method for operating user equipment (UE) in a coexistence mode, comprising:
    instructions for sending, to a network component, a message to request a coexistence mode for the first and second radio technology components, the message comprising a buffer status report which indicates one or more parameters related to one or more uplink buffers at the UE;
    instructions for receiving, from the network component, a response message identifying a time division multiplexing (TDM) pattern for the first radio technology component for establishing the coexistence mode, wherein the TDM pattern for the first radio technology component is based at least in part on the buffer status report and include on-intervals and off-intervals for the first radio technology component; and
    instructions for enabling first and second radio technology components with the one or more control parameters to use radio resources on the UE wherein resources are allocated to the first and second radio technology components based at least in part on the buffer status report.

10. The method of claim 9, where the control parameters allocate downlink and uplink subframes for at least one radio component at the UE.

11. A user equipment (UE), comprising:
    a first radio technology component;
    a second radio technology component; and
    one or more processors configured to:
        send, to a network component, a message to request a coexistence mode for the first and second radio technology components, the message comprising a buffer status report which indicates one or more parameters related to one or more uplink buffers at the UE, the one or more parameters indicates, to the network component, existing inference between the first and second radio technology components, and the coexistence mode allocates radio resources that reduce the existing inference between the first and second radio technology components;
        receive, from the network component, a response message identifying a time division multiplexing (TDM) pattern for the first radio technology component for establishing the coexistence mode, wherein the TDM pattern for the first radio technology component is based at least in part on the buffer status report and includes on-intervals and off-intervals for the first radio technology component; and
        enable the first and second radio technology components with the one or more control parameters to use radio resources on the UE wherein resources are allocated to the first and second radio technology components based at least in part on the buffer status report.

12. The UE of claim 11, where the first radio component comprises an LTE component, and where the second radio technology component comprises a Global Navigation Satellite System (GNSS) component or an Industrial, Science and Medical (ISM) component.

13. The UE of claim 11, the one or more processors further configured to send the message when a buffer receives uplink data for a logical channel which has a higher priority than a logical channel for data in an existing uplink buffer or when a serving cell for the UE changes.

14. The UE of claim 11, the one or more processors further configured to send messages at regular intervals.

15. The UE of claim 11, where the buffer status report includes a quantitative measure which indicates how much data is buffered in one or more uplink buffers at the UE or comprises an indication of whether data available for transmission on one or more uplink buffers at the UE meets or exceeds a threshold level.

16. The UE of claim 11, where send the message comprises at least one of send the buffer status report for a high priority uplink buffer at the UE, send the buffer status report for a low priority uplink buffer at the UE, send the buffer status report in response to a request from the network component, or send the buffer status report without being requested by the network component.

17. A network component, comprising:
    one or more processors configured to:
        receive, from a user equipment (UE), a buffer status report comprising one or more parameters related to one or more uplink buffers at the UE, the one or more parameters indicate existing inference between the first and second radio technology components; and
        send, to the UE, a response message identifying a time division multiplexing (TDM) pattern for the first radio technology component for establishing a coexistence mode, wherein the TDM pattern for the first radio technology component is based at least in part on the buffer status report and include on-intervals and off-intervals for the first radio technology component, the coexistence mode allocates radio resources that reduce the existing inference between the first and second radio technology components.

18. The network component of claim 17, where the control parameters allocate downlink and uplink subframes for at least one radio component at the UE.

* * * * *